(12) United States Patent
Aoi et al.

(10) Patent No.: US 6,704,465 B2
(45) Date of Patent: *Mar. 9, 2004

(54) IMAGE PROCESSING APPARATUS AND ITS PROCESSING METHOD, STORAGE MEDIUM, AND IMAGE FILE FORMAT

(75) Inventors: Shigeru Aoi, Yokohama (JP); Taku Yamagami, Yokohama (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/265,586

(22) Filed: Mar. 10, 1999

(65) Prior Publication Data

US 2003/0169349 A1 Sep. 11, 2003

(30) Foreign Application Priority Data

Mar. 12, 1998 (JP) .............................. 10-061239

(51) Int. Cl.[7] .............................. G06K 9/60; H04N 7/18; H04N 13/02; H04N 7/00
(52) U.S. Cl. .................. 382/305; 382/307; 382/306; 348/64; 348/50; 348/49; 348/36
(58) Field of Search ................. 382/305, 284, 382/282, 294, 306, 307, 317, 318; 707/200, 205, 104.1; 348/36, 47, 48, 49, 50, 64, 305, 153, 174; 358/403, 450, 404, 453

(56) References Cited

U.S. PATENT DOCUMENTS

| 5,130,813 A | * | 7/1992 | Oie et al. ................ 358/335 |
| 5,481,330 A | * | 1/1996 | Yamasaki ................ 354/412 |
| 5,682,197 A | * | 10/1997 | Moghadam et al. ........ 348/36 |
| 5,719,987 A | * | 2/1998 | Kawamura et al. ....... 386/120 |
| 5,724,582 A | * | 3/1998 | Pelanek et al. ........... 395/620 |
| 5,739,850 A | * | 4/1998 | Hori ....................... 348/231 |
| 5,779,319 A | | 7/1998 | Merrick |
| 6,128,102 A | * | 10/2000 | Ota ........................ 358/403 |
| 6,151,421 A | * | 11/2000 | Yamada ................... 382/284 |
| 6,346,998 B2 | * | 2/2002 | Shiota et al. ............. 358/487 |

FOREIGN PATENT DOCUMENTS

| EP | 0 588 243 | 3/1994 |
| JP | 5-252474 | 9/1993 |
| JP | 6-233225 | 8/1994 |
| JP | 7-295873 | 11/1995 |
| JP | 8-273494 | 10/1996 |

* cited by examiner

Primary Examiner—Bhavesh M. Mehta
Assistant Examiner—Yosef Kassa
(74) Attorney, Agent, or Firm—Fitzpatrick, Cella, Harper & Scinto

(57) ABSTRACT

To simplify the file operation of images recorded as a group of panorama images or the like.

A character (ST) showing that it is included in a group, alphanumeric character assigned in order in each group, and characters showing file numbers in order of photographing are used as a file name of images to be recorded and a character showing an image compression method is used as the extension of a file name.

43 Claims, 18 Drawing Sheets

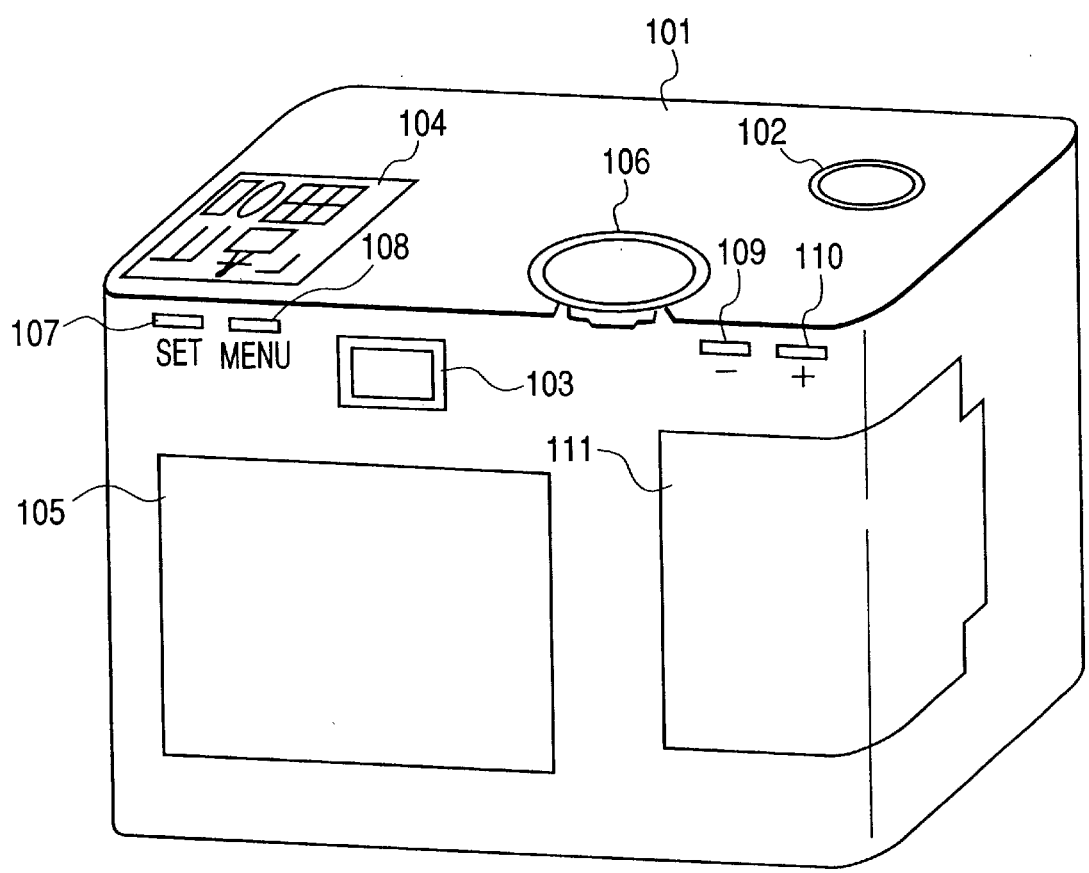

[SET] START  [+] SELECT

[SET] END  [+] MOVE

FIG. 3

| DIRECTORY | FILE NAME | GROUP | POSITION |
|---|---|---|---|
| CTG_0068.CTG | | | |
| | . . . . . . . | | |
| | IMG_3432.JPG | SINGLE | |
| | IMG_3433.JPG | SINGLE | |
| | IMG_3434.JPG | SINGLE | |
| | STA_3435.JPG | 1 | RIGHT ABOVE |
| | STB_3436.JPG | 1 | RIGHT BELOW |
| | STC_3437.JPG | 1 | LEFT BELOW |
| | STD_3438.JPG | 1 | LEFT ABOVE |
| | IMG_3439.JPG | SINGLE | |
| | IMG_3440.JPG | SINGLE | |
| | STA_3441.JPG | 2 | LEFT |
| | STB_3442.JPG | 2 | 2ND FROM LEFT |
| | STA_3443.JPG | 3 | RIGHT |
| | STB_3444.JPG | 3 | 2ND FROM RIGHT |
| | STC_3445.JPG | 3 | 3RD FROM RIGHT |
| | IMG_3446.JPG | SINGLE | |
| | IMG_3447.JPG | SINGLE | |
| | IMG_3448.JPG | SINGLE | |
| | IMG_3449.JPG | SINGLE | |
| | STA_3450.JPG | 4 | TOP |
| CTG_0069.CTG | | | |
| | STB_3451.JPG | 4 | 2ND FROM TOP |
| | IMG_3452.JPG | SINGLE | |
| | IMG_3453.JPG | SINGLE | |
| | IMG_3454.JPG | SINGLE | |
| | IMG_3455.JPG | SINGLE | |
| | . . . . . . . | | |

FIG. 4A

| STD_3438.JPG | STA_3435.JPG |
|---|---|
| STC_3437.JPG | STB_3436.JPG |

FIG. 4B

| STA_3441.JPG | STB_3442.JPG |
|---|---|

FIG. 4C

| STC_3445.JPG | STB_3444.JPG | STA_3443.JPG |
|---|---|---|

FIG. 4D

| STA_3450.JPG |
|---|
| STB_3451.JPG |

FIG. 6

| DIRECTORY | FILE NAME | GROUP | POSITION |
|---|---|---|---|
| CTG_0070. CTG | . . . . . . . | | |
| | IMG_3532. JPG | SINGLE | |
| | IMG_3533. JPG | SINGLE | |
| | IMG_3534. JPG | SINGLE | |
| | PNA_3535. JPG | 1 | RIGHT ABOVE |
| | PNA_3536. JPG | 1 | RIGHT BELOW |
| | PNA_3537. JPG | 1 | LEFT BELOW |
| | PNA_3538. JPG | 1 | LEFT ABOVE |
| | IMG_3539. JPG | SINGLE | |
| | IMG_3540. JPG | SINGLE | |
| | PNB_3541. JPG | 2 | LEFT |
| | PNB_3542. JPG | 2 | 2ND FROM LEFT |
| | PNC_3543. JPG | 3 | RIGHT |
| | PNC_3544. JPG | 3 | 2ND FROM RIGHT |
| | PNC_3545. JPG | 3 | 3RD FROM RIGNT |
| | IMG_3546. JPG | SINGLE | |
| | IMG_3547. JPG | SINGLE | |
| | IMG_3548. JPG | SINGLE | |
| | IMG_3549. JPG | SINGLE | |
| | PND_3550. JPG | 4 | TOP |
| CTG_0071. CTG | | | |
| | PND_3551. JPG | 4 | 2ND FROM TOP |
| | IMG_3552. JPG | SINGLE | |
| | IMG_3553. JPG | SINGLE | |
| | IMG_3554. JPG | SINGLE | |
| | IMG_3555. JPG | SINGLE | |
| | . . . . . . . | | |

FIG. 7A

| PNA_3538.JPG | PNA_3535.JPG |
|---|---|
| PNA_3537.JPG | PNA_3536.JPG |

FIG. 7B

| PNB_3541.JPG | PNB_3542.JPG |
|---|---|

FIG. 7C

| PNC_3545.JPG | PNC_3544.JPG | PNC_3543.JPG |
|---|---|---|

FIG. 7D

| PND_3550.JPG |
|---|
| PND_3551.JPG |

FIG. 9

| DIRECTORY | FILE NAME | GROUP | POSITION |
|---|---|---|---|
| CTG_0072. CTG | . . . . . . . | | |
| | IMG_3632. JPG | SINGLE | |
| | IMG_3633. JPG | SINGLE | |
| | IMG_3634. JPG | SINGLE | |
| | P10_3635. JPG | 1 | RIGHT ABOVE |
| | P11_3636. JPG | 1 | RIGHT BELOW |
| | P01_3637. JPG | 1 | LEFT BELOW |
| | P00_3638. JPG | 1 | LEFT ABOVE |
| | IMG_3639. JPG | SINGLE | |
| | IMG_3640. JPG | SINGLE | |
| | Q00_3641. JPG | 2 | LEFT |
| | Q10_3642. JPG | 2 | 2ND FROM LEFT |
| | P20_3643. JPG | 3 | RIGHT |
| | P10_3644. JPG | 3 | 2ND FROM RIGHT |
| | P00_3645. JPG | 3 | 3RD FROM RIGNT |
| | IMG_3646. JPG | SINGLE | |
| | IMG_3647. JPG | SINGLE | |
| | IMG_3648. JPG | SINGLE | |
| | IMG_3649. JPG | SINGLE | |
| | Q00_3650. JPG | 4 | TOP |
| CTG_0073. CTG | Q01_3651. JPG | 4 | 2ND FROM TOP |
| | IMG_3652. JPG | SINGLE | |
| | IMG_3653. JPG | SINGLE | |
| | IMG_3654. JPG | SINGLE | |
| | IMG_3655. JPG | SINGLE | |
| | . . . . . . . | | |

FIG. 10A

| P00_3638.JPG | P10_3635.JPG |
|---|---|
| P01_3637.JPG | P11_3636.JPG |

FIG. 10B

| Q00_3641.JPG | Q10_3642.JPG |
|---|---|

FIG. 10C

| P00_3645.JPG | P10_3644.JPG | P20_3643.JPG |
|---|---|---|

FIG. 10D

| Q00_3650.JPG |
|---|
| Q01_3651.JPG |

FIG. 12

| DIRECTORY | FILE NAME | GROUP | POSITION |
|---|---|---|---|
| CTG_0074.CTG | . . . . . . . | | |
| | IMA_3732.JPG | SINGLE | |
| | IMA_3733.JPG | SINGLE | |
| | IMA_3734.JPG | SINGLE | |
| | IMA_3735.JPG | 1 | RIGHT ABOVE |
| | IMB_3736.JPG | 1 | RIGHT BELOW |
| | IMC_3737.JPG | 1 | LEFT BELOW |
| | IMD_3738.JPG | 1 | LEFT ABOVE |
| | IMA_3739.JPG | SINGLE | |
| | IMA_3740.JPG | SINGLE | |
| | IMA_3741.JPG | 2 | LEFT |
| | IMB_3742.JPG | 2 | 2ND FROM LEFT |
| | IMA_3743.JPG | 3 | RIGHT |
| | IMB_3744.JPG | 3 | 2ND FROM RIGHT |
| | IMC_3745.JPG | 3 | 3RD FROM RIGNT |
| | IMA_3746.JPG | SINGLE | |
| | IMA_3747.JPG | SINGLE | |
| | IMA_3748.JPG | SINGLE | |
| | IMA_3749.JPG | SINGLE | |
| | IMA_3750.JPG | 4 | TOP |
| CTG_0075.CTG | IMB_3751.JPG | 4 | 2ND FROM TOP |
| | IMA_3752.JPG | SINGLE | |
| | IMA_3753.JPG | SINGLE | |
| | IMA_3754.JPG | SINGLE | |
| | IMA_3755.JPG | SINGLE | |
| | . . . . . . . | | |

FIG. 13A

| IMD_3738. JPG | IMA_3735. JPG |
|---|---|
| IMC_3737. JPG | IMB_3736. JPG |

FIG. 13B

| IMA_3741. JPG | IMB_3742. JPG |
|---|---|

FIG. 13C

| IMC_3745. JPG | IMB_3744. JPG | IMA_3743. JPG |
|---|---|---|

FIG. 13D

| IMA_3750. JPG |
|---|
| IMB_3751. JPG |

FIG. 15

| DIRECTORY | FILE NAME | GROUP | POSITION |
|---|---|---|---|
| CTG_0066. CTG | . . . . . . . | | |
| | IMG_3332. JPG | SINGLE | |
| | IMG_3333. JPG | SINGLE | |
| | IMG_3334. JPG | SINGLE | |
| | IMG_3335. JPG | 1 | RIGHT ABOVE |
| | IMG_3336. JPG | 1 | RIGHT BELOW |
| | IMG_3337. JPG | 1 | LEFT BELOW |
| | IMG_3338. JPG | 1 | LEFT ABOVE |
| | IMG_3339. JPG | SINGLE | |
| | IMG_3340. JPG | SINGLE | |
| | IMG_3341. JPG | 2 | LEFT |
| | IMG_3342. JPG | 2 | 2ND FROM LEFT |
| | IMG_3343. JPG | 3 | RIGHT |
| | IMG_3344. JPG | 3 | 2ND FROM RIGHT |
| | IMG_3345. JPG | 3 | 3RD FROM RIGNT |
| | IMG_3346. JPG | SINGLE | |
| | IMG_3347. JPG | SINGLE | |
| | IMG_3348. JPG | SINGLE | |
| | IMG_3349. JPG | SINGLE | |
| | IMG_3350. JPG | 4 | TOP |
| CTG_0067. CTG | | | |
| | IMG_3351. JPG | 4 | 2ND FROM TOP |
| | IMG_3352. JPG | SINGLE | |
| | IMG_3353. JPG | SINGLE | |
| | IMG_3354. JPG | SINGLE | |
| | IMG_3355. JPG | SINGLE | |
| | . . . . . . . | | |

FIG. 16A

| IMG_3338.JPG | IMG_3335.JPG |
|---|---|
| IMG_3337.JPG | IMG_3336.JPG |

FIG. 16B

| IMG_3341.JPG | IMG_3342.JPG |
|---|---|

FIG. 16C

| IMG_3345.JPG | IMG_3344.JPG | IMG_3343.JPG |
|---|---|---|

FIG. 16D

| IMG_3350.JPG |
|---|
| IMG_3351.JPG |

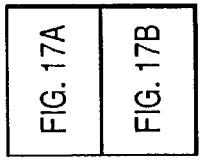
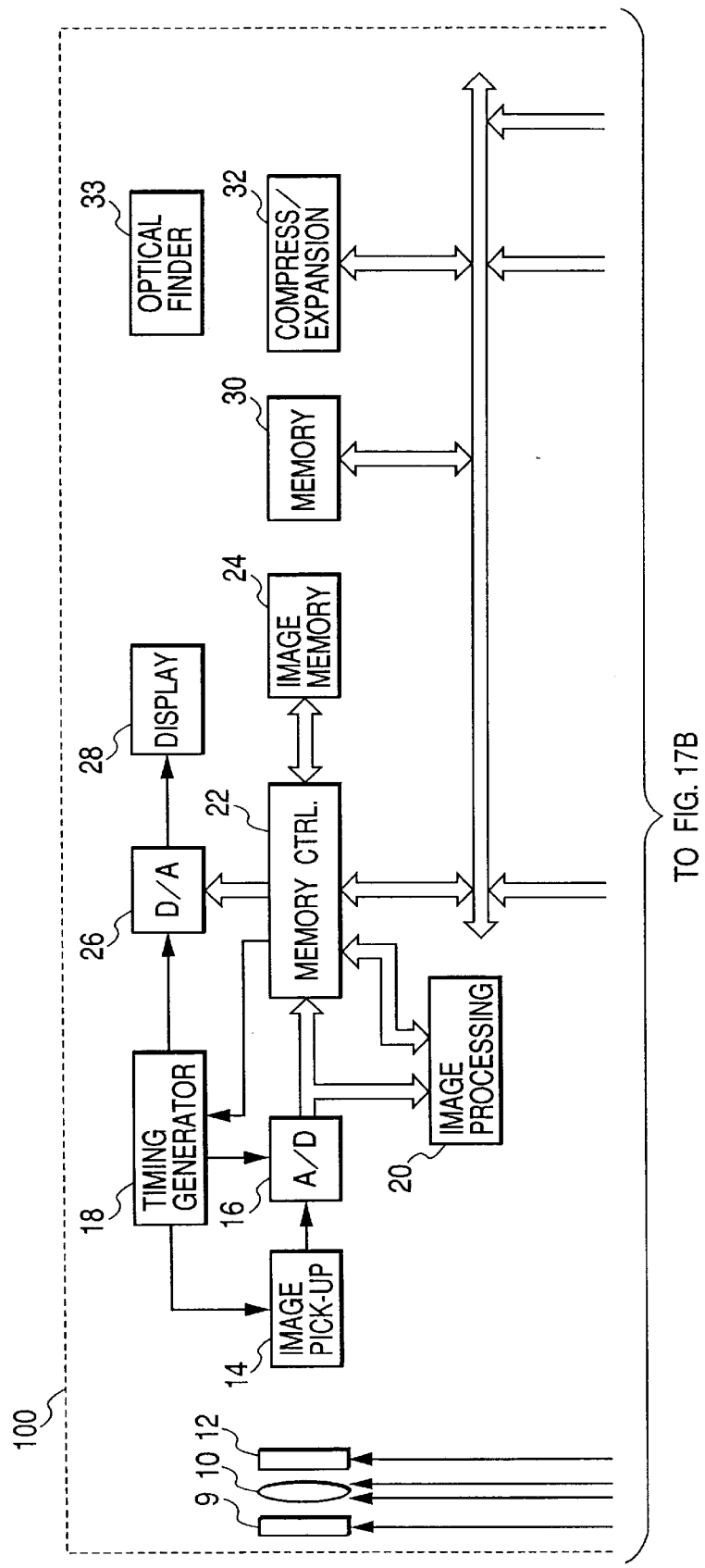

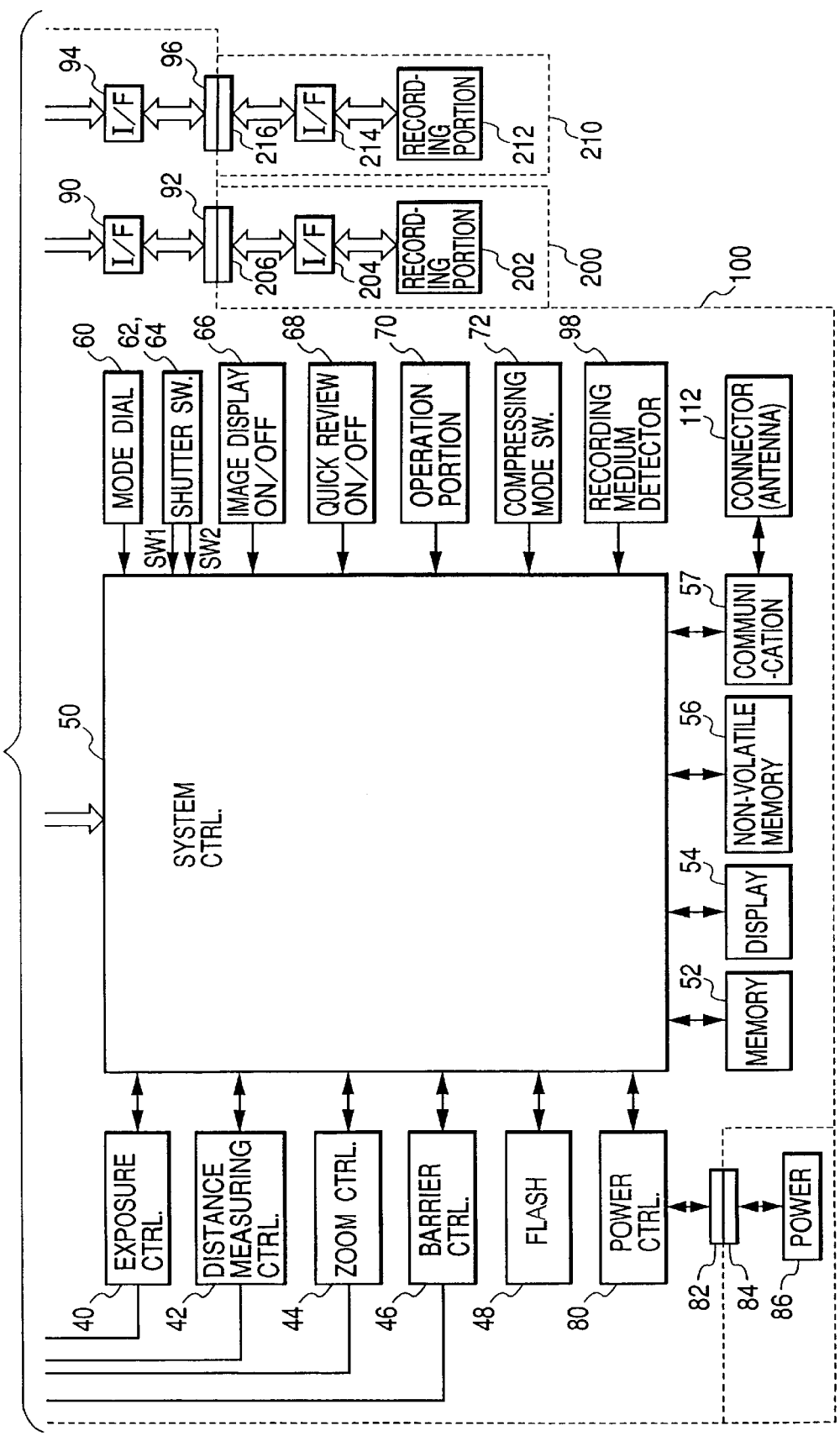

IMAGE PROCESSING APPARATUS AND ITS PROCESSING METHOD, STORAGE MEDIUM, AND IMAGE FILE FORMAT

BACKGROUND OF THE INVENTION

1. Field of the Invention

The present invention relates to an image processing apparatus and its processing method for recording a photographed image as a digital image and reproducing the recorded digital image, an image file format, and a storage medium.

2. Related Background Art

A digital electronic still camera has been recently developed which converts an video signal into a digital signal and records the digital signal in a PCMCIA recording medium such as a semiconductor memory card or compact hard disk. The digital recording medium is constituted so as to be able to read data with a personal computer.

As a conventional art for video data to be generated by the digital electronic still camera, there is the format described in "IC Memory Card Line DSC 68 Pin Standard for Digital Still Camera" issued by JEIDA (Japan Electronic Industry Development Association).

In the case of this standard, the PCMCIA recording medium is used as a MS-DOS-compatible block device and a video file and an audio file are recorded on a medium as files. Moreover, additional pieces of information related to an image such as photographed date, photographing mode, and photographing condition are recorded in each file.

Moreover, to reproduce video information or an audio file recorded in the medium on a personal computer, it is possible for a user to select a file to be reproduced by using functions of DOS and thereby, reading through the information for files present in a specific subdirectory and displaying the information on a computer screen.

In this case, however, pieces of information to be understood by DOS are restricted to a file name, a file generated date, and a file size. That is, because these pieces of information are recorded in a continuous region on a medium in accordance with the directory constitution rules of DOS, it is possible to restore the pieces of information at a relatively high speed. Moreover, by making the file generated date coincide with the photographed date, it is possible to display the information which can be more easily understood by a user.

In the case of the above file control, the official gazettes of Japanese Patent Application Laid-Open Nos. 5-252474 and 6-233225 disclose recording an image by including a character showing that continuous photographing was performed, a number attached to every group of continuously photographed images, and serial numbers for continuous photographing in a file name as a method of recording a plurality of images continuously photographed so that the images can be identified as one set.

Moreover, the present applicant proposes a system for successively attaching file numbers to file names without duplication as long as the same photographing apparatus is used in Japanese Patent Application No. 8-273494.

FIG. 15 shows file names according to the file control system. "IMG" is attached to three characters at the head of a file name and a file number currFileNo using a five-digit numeral which increases one by one every photographing is attached to the next five characters. The file number currFileNo is stored in a camera.

When recording media are replaced, the maximum file number FileNoFound among the file numbers attached to file names of the files stored in a newly-set recording medium is compared with file numbers stored in the camera. Then, when currFileNo is larger than FileNoFound, the currFileNo is directly used. However, when currFileNo is not larger than the FileNoFound, FileNoFound+1 is stored in the camera and used.

In this case, when the most significant value in a five-digit numeral is "0," "0" is replaced with symbol "_" so that it can be easily seen. Because three characters serving as an extension are a JPEG-compressed image file, "JPG" is attached. For files, every 50 file numbers are arranged in another directory so that they can be easily retrieved. In this case, files having file numbers 3332 to 3350 are arranged in the directory of "CTG_0066.CTG" and files having file numbers 3351 to 3400 are arranged in the directory of "CTG-0067.CTG".

FIGS. 16A to 16D show image structures when photographed in the panorama mode. Though images not shown in FIGS. 16A to 16D are obtained through single photographing, it is impossible to decide from the file name whether they are photographed in the panorama mode. The information for a position for constituting a panorama is recorded in a file.

As described above, the prior art has a problem that it is impossible to distinguish between photographing sequences of photographing as a group and single photographing by only a file name because file name systems are different between a group of continuous photographing and single photographing or a file name whose group cannot be decided is used.

The present invention is made to solve the above problems and its object is to make it possible to display the information for images recorded in a recording medium for a user at a high speed.

SUMMARY OF THE INVENTION

An embodiment of the present invention provides an image processing apparatus comprising:
- first assignment means for assigning the information for specifying an image;
- second assignment means for assigning the information showing constituting a group to a group of images constituted with a plurality of images; and
- storage means for storing the information assigned by the first assignment means and the second assignment means as file names of images.

BRIEF DESCRIPTION OF THE DRAWINGS

FIG. 1 is an illustration showing the operation portion and display portion of a digital camera;

FIG. 3 is an illustration showing file names of the first embodiment;

FIGS. 4A, 4B, 4C and 4D are illustrations showing structures of panorama images of the first embodiment;

FIG. 6 is an illustration showing file names of the second embodiment;

FIGS. 7A, 7B, 7C and 7D are illustrations showing structures of panorama images of the second embodiment;

FIG. 9 is an illustration showing file names of the third embodiment;

FIGS. 10A, 10B, 10C and 10D are illustrations showing structures of panorama images of the third embodiment;

FIG. 12 is an illustration showing file names of the fourth embodiment;

FIGS. 13A, 13B, 13C and 13D are illustrations showing structures of panorama images of the fourth embodiment;

FIG. 15 is an illustration showing file names of a conventional example;

FIGS. 16A, 16B, 16C and 16D are illustrations showing structures of panorama images of a conventional example; and FIG. 17 is comprised of FIGS. 17A and 17B which are illustrations showing the structure of an embodiment of the present invention.

DESCRIPTION OF THE PREFERRED EMBODIMENTS (First Embodiment)

FIG. 1 is an illustration showing the operation portion and display portion of a digital camera 101 when viewing the camera 101 from its back.

In FIG. 1, symbol 102 denotes a release button for starting the release operation, 103 denotes an optical finder, 104 denotes an LCD for displaying a camera state such as the photographed number of frames of a film, 105 denotes an LCD serving as both an electronic view finder and an indication for showing a camera state, and 106 denotes a mode dial for selecting a camera mode, serving as mode selection means capable of turning on/off the power supply of a camera and selecting the normal photographing mode, panorama photographing mode, and image reproducing-displaying mode.

Symbols 107, 108, 109, and 110 denote buttons used by interlocking with an LCD when setting details of a mode. When the panorama photographing mode is selected by the mode dial 106, a 2×2 mode, a horizontal one-line mode, and a vertical one-line mode to be shown later are selected by using these buttons and LCD indications. Moreover, when the horizontal one-line mode is selected, it is selected whether to start photographing from right or left in order. Furthermore, when the vertical one-line mode is selected, it is selected whether to start photographing from top to bottom or bottom to top in order.

Photographing of a group of images is completed by a SET button 107 in each mode. Symbol 111 denotes the lid of a recording-medium storage portion. The digital camera 101 controls the whole of the camera 101 with an internal microcomputer and moreover, controls the following files.

Figure 2A:
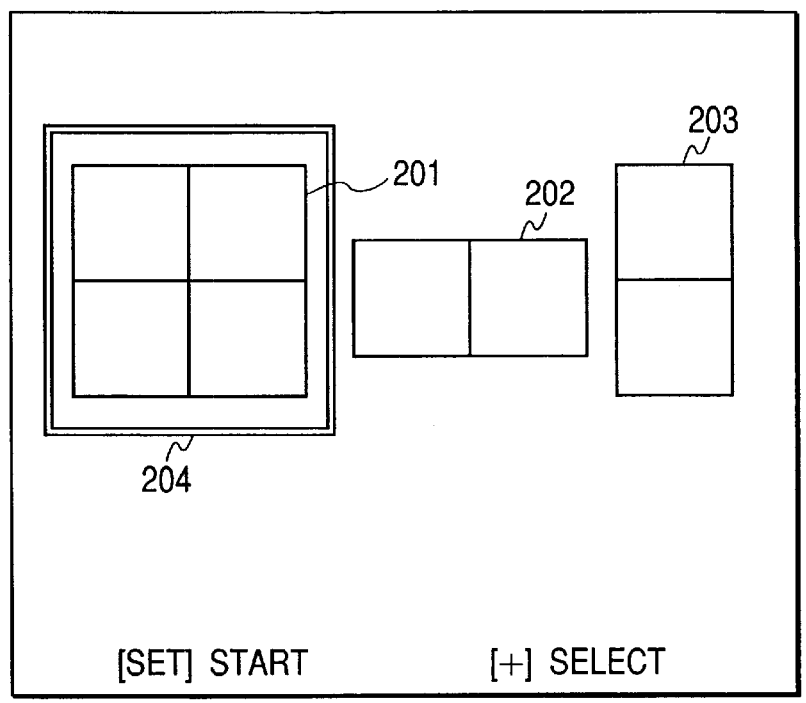
FIGS. 2A and 2B are illustrations showing LCD indications of a digital camera.
Figure 2B:
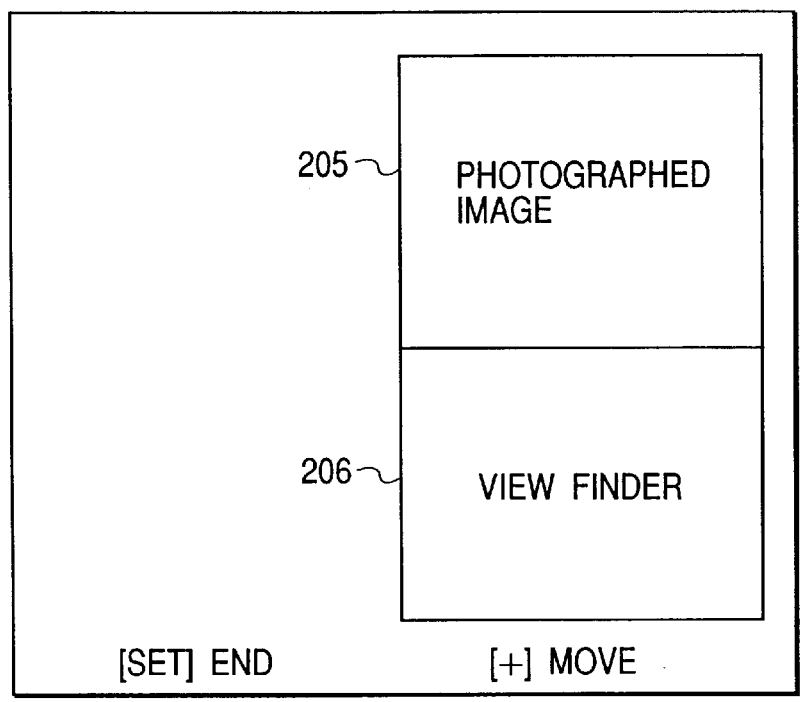

FIGS. 2A and 2B are screens to be displayed on the view finder 105 when selecting the panorama mode with the mode dial 106.

FIGS. 17A and 17B are illustrations showing the structure of an embodiment of the present invention.

In FIGS. 17A and 17B, symbol 100 denotes a block diagram of the digital camera 101 shown in FIG. 1.

Symbol 10 denotes a photographing lens, 12 denotes a shutter having a diaphragm function, 14 denotes an image pickup device for converting an optical image into an electric signal, and 16 denotes an A-D converter for converting the analog signal output of the image pickup device 14 into a digital signal.

Symbol 18 denotes a timing generation circuit for supplying a clock signal and a control signal to the image pickup device 14, the A-D converter 16, and a D-A converter 26, which is controlled by a memory control circuit 22 and a system control circuit 50.

Symbol 20 denotes an image processing circuit for applying the predetermined image complementation and color conversion to the data supplied from the A-D converter 16 or the memory control circuit 22.

Moreover, the image processing circuit 20 performs a predetermined processing by using picked-up video data and moreover, performs the TTL (Through The Lens)-type AF (Auto Focus) processing, AE (Auto Exposure) processing, and EF (before emission of flash) processing in which the system control circuit 50 controls exposure control means 40 and distance-measuring control means 42 in accordance with an obtained operation result.

Furthermore, the image processing circuit 20 performs a predetermined operation by using picked-up video data and performs the TTL-type AWB (Auto White Balance) processing in accordance with an obtained operation result.

Symbol 22 denotes a memory control circuit for controlling the A-D converter 16, the timing generation circuit 18, the image processing circuit 20, an image display memory 24, a D-A converter 26, a memory 30, and a compression/expansion circuit 32.

The data in the A-D converter 16 is written in the image display memory 24 or memory 30 directly or through the image processing circuit 20 and memory control circuit 22.

Symbol 24 denotes the above image display memory, 26 denotes the above D-A converter, and 28 denotes an image display portion constituted with a TFT and an LCD. The video data to be displayed written in the image display memory 24 is displayed by the image display portion 28 through the D-A converter 26.

By sequentially displaying the video data picked up by the image display portion 28, it is possible to realize the electronic-finder function.

Moreover, the image display portion 28 is able to optionally turn on/off an indication in accordance with a designation by the system control circuit 50. By turning off the indication, it is possible to greatly reduce the power consumption of the image processing apparatus 100.

Symbol 30 denotes the memory for storing photographed dynamic image and static image, having a storage capacity large enough to store a predetermined number of static images and dynamic images for a predetermined time.

Thereby, in the case of continuous photographing for continuously photographing a plurality of static images or panorama photographing, it is possible to write a lot of images in the memory 30 at a high speed.

Moreover, the memory 30 can be used as the work region of the system control circuit 50.

Symbol 32 denotes the above compression/expansion circuit for compressing or expanding video data through the adaptive discrete cosine transform (ADCT), which reads an image from the memory 30, compress or expand the image, and writes the compressed or expanded data in the memory 30.

Symbol 40 denotes the above exposure control means for controlling a shutter 12 having the diaphragm function, which has the flash-light-adjusting function by interlocking with the flash 48.

Symbol 42 denotes the above distance-measuring control means for controlling the focusing of a photographing lens 10, 44 denotes zoom control means for controlling the zooming of the photographing lens 10, and 46 denotes barrier control means for controlling operations of protection means 9 serving as a barrier.

Symbol 48 denotes a flash having the AF-support-light-projecting function and flash-light-adjusting function.

The exposure control means 40 and the distance-measuring control means 42 are controlled by a TTL system in which the system control circuit 50 controls the exposure control means 40 and distance-measuring control means 42 in accordance with the operation result obtained by computing picked-up video data with the image processing circuit 20.

Symbol 50 denotes the above system control circuit for controlling the whole of the image processing apparatus 100 and 52 denotes a memory for storing constants, variables, and programs for operating the system control circuit 50.

Symbol 54 denotes a display portion of a liquid-crystal display for displaying an operating state and a message by using characters, images, and sounds and a loud speaker. One system control circuit 50 or a plurality of system control circuits 50 is or are set to a visible position or positions nearby the operation portion of the image processing apparatus 100 and constituted by combining, for example, an LCD, an LED, and a sound-producing device.

Moreover, in the case of the display portion 54, some of the functions are set in the optical finder 33.

The following are the contents to be displayed on an LCD or the like among those to be displayed by the display portion 54:

single-shot/continuous-photographing indication, self-timer indication, compression rate indication, recorded-number-of-pixel indication, recorded-number-of-frame indication, remaining-number-of-photographic-frame indication, shutter speed indication, diaphragm value indication, exposure correction indication, flash indication, red-eye moderation indication, macro-photography indication, buzzer-setting indication, remaining-amount-of-timer-battery indication, remaining-amount-of-battery indication, error indication, indication for information shown by numeral of a plurality of digits, indication showing set or removed state of recording medium 200 or 210, communication I/F operation indication, date-and-time indication, and indication showing connection state with external computer.

Moreover, the contents to be displayed in the optical finder 33 among those to be displayed by the display portion 54 include focused-state indication, photographing-preparation completed state indication, hand-movement warning indication, flash charging indication, flash-charging completed state indication, shutter speed indication, diaphragm value indication, exposure correction indication, and recording-medium write operation indication.

Furthermore, the contents to be displayed on an LED or the like among those to be displayed by the display portion 54 include focused-state indication, photographing-preparation completed state indication, hand-movement warning indication, flash-charging indication, flash-charging completed state indication, recording-medium write operation indication, macro-photography setting notice indication, and secondary-battery charged state indication.

Furthermore, the contents to be displayed on a lamp or the like among those to be displayed by the display portion 54 include self-timer notification lamp indication. A self-timer notification lamp can be also used together with the AF support light.

Symbol 56 denotes an electrically-erasable nonvolatile memory which uses an EEPROM and so on.

Symbols 60, 62, 64, 66, 68, 70, and 72 denote operation means for inputting various operation designations of the system control circuit 50, which are constituted by combining a switch or switches, a dial or dials, a touch panel or touch panels, pointing according to sight line detection, and a speech recognition system or speech recognition systems.

The above operation means are specifically described below.

Symbol 60 denotes a mode dial switch capable of turning off a power supply and switching and setting various functional modes such as the automatic photographing mode, manual photographing mode, panorama photographing mode, reproducing mode, multi-screen reproducing/erasing mode, and PC connection mode.

Symbol 62 denotes a shutter speed switch SW1 which is turned on while operating a not-illustrated shutter button and designates the start of the operation such as AF (Auto Focus) processing, AE (Auto Exposure) processing, AWB (Auto White Balance) processing, or EF (before emission of flash) processing.

Symbol 64 denotes a shutter switch SW2 which is turned on after a not-illustrated shutter button is operated and designates the start of a series of the operations such as the exposure processing of writing a signal read from the image pickup device 12 in the memory 30 as video data through the A-D converter 16 and memory control circuit 22, development processing using the operations by the image processing circuit 20 and memory control circuit 22, and recording processing of reading video data from the memory 30, compressing the data with the compression/expansion circuit 32, and writing the data in the recording medium 200 or 210.

Symbol 66 denotes an image-display on/off switch capable of setting on/off of the image display portion 28.

According to the above function, it is possible to save the power by stopping the current supply to the image display portion constituted with a TFT and an LCD when performing photographing by the optical finder 33.

Symbol 68 denotes a quick-review on/off switch for setting the quick review function for automatically reproducing the video data photographed immediately after photographing. This embodiment is particularly provided with a function for setting the quick review function when turning off the image display portion 28.

Symbol 70 denotes an operation portion constituted with a touch panel and various buttons such as a menu button, setting button, micro button, multi-screen reproducing/page-feed button, flash setting button, single-photographing/continuous-photographing/self-timer switching button, menu moving + (plus) button, menu moving − (minus) button, reproduced image moving + (plus) button, reproduced image moving − (minus) button, photographing-image-quality selection button, exposure correction button, and date/time setting button.

Symbol 72 denotes a compression mode switch for selecting the compression rate of JPEG compression or the CCDRAW mode for directly digitizing the signal of an image pickup device and recording it in a recording medium.

JPEG compression mode includes normal mode and fine mode.

In the JPEG compression mode, the video data read from the image pickup device 14 and written in the memory 30 through the A-D converter 16, image processing circuit 20, and memory control circuit 22 is read and compressed at a compression rate set by the compression/expansion circuit 32 and then recorded in the recording medium 200 or 210.

In the CCDRAW mode, video data is directly read every line in accordance with the pixel arrangement of color filters of the image pickup device 14, the video data written in the memory 30 is read through the A-D converter 16 and memory control circuit 22, and recorded in the recording medium 200 or 210.

Symbol 80 denotes power-supply control means constituted with a battery detection circuit, a DC-DC converter, and a switching circuit for switching blocks to be turned on, which detects whether a battery is set, type of the battery, and remaining amount of the battery, controls the DC-DC converter in accordance with a detection result and a designation by the system control circuit 50, and supplies a necessary voltage to various portions including a recording medium for a necessary period.

Symbol 82 denotes a connector, 84 denotes a connector, and 86 denotes power-supply means constituted with a primary battery such as an alkaline battery or a lithium battery, a secondary battery such as a NiCd battery, NiMH battery, or Li battery, and an AC adapter.

Symbols 90 and 94 respectively denote an interface with a recording medium such as a memory card or a hard disk, 92 and 96 respectively denote a connector for connection with a recording medium such as a memory card or a hard disk, and 98 denotes recording-medium set/removed-state detection means for detecting whether the recording medium 200 or 201 is set to the connector 92 and/or connector 96.

This embodiment is described by assuming that the embodiment has two interfaces and connectors for mounting a recording medium. It is a matter of course that a structure can be used which is provided with one interface and one connector for mounting a recording medium or a plurality of interfaces and a plurality of connectors for mounting a recording medium. Moreover, it is possible to use a structure obtained by combining interfaces and connectors based on standards different from each other. Furthermore, it is possible to constitute a structure using an interface and a connector based on the standard for a PCMCIA card or a CF (compact flash) card.

Furthermore, when constituting the interfaces 90 and 94 and the connectors 92 and 96 with components based on the standard for a PCMCIA card or a CF (compact flash) card, it is possible to transfer video data or control information attached to the video data to and from a peripheral unit such as other computer or printer by connecting various communication cards such as a LAN card, modem card, USB card, IEEE1394 card, P1284 card, SCSI card, and PHS.

Symbol 102 in FIG. 1 denotes protection means serving as a barrier for preventing an image pickup portion including the lens 10 of the image processing apparatus 100 from being contaminated or broken by covering the image pickup portion.

Symbol 33 denotes the above-described optical finder making it possible to perform photographing by only the optical finder without using the electronic finder function of the image display portion 28. Moreover, some of the functions of the display portion 54 such as the focused-state indication, hand-movement warning indication, flash-charging indication, shutter speed indication, diaphragm value indication, and exposure correction indication are set in the optical finder 33.

Symbol 57 denotes communication means having various communication functions such as RS232C and USB, IEEE1394, P1284, SCSI, modem, LAN, and radio communication.

Symbol 112 denotes a connector for connecting the image processing apparatus 100 with other unit by the communication means 110 or an antenna in the case of radio communication.

Symbol 200 denotes the above-described recording medium such as a memory card or a hard disk.

The recording medium 200 is provided with a recording portion 202 constituted with a semiconductor memory and a magnetic disk, an interface 204 with the image processing apparatus 100, and a connector 206 for connection with the image processing apparatus 100.

Symbol 210 denotes the above-described recording medium such as a memory card or a hard disk.

The recording medium 210 is provided with a recording portion 212 constituted with a semiconductor memory and a magnetic disk, an interface 214 with the image processing apparatus 100, and a connector 216 for connection with the image processing apparatus 100.

FIG. 2A shows a screen for selecting details of the panorama mode, which is displayed immediately after the panorama mode is selected by the mode dial 106 or when photographing is completed in one of the 2×2 mode, horizontal one-line mode, and vertical one-line mode. Symbols 201, 202, and 203 are icons showing the 2×2 mode, horizontal one-line mode, and vertical one-line mode. Whenever a [+] button 110 is pressed, a selection frame cursor 204 moves. It is possible to select and designate a [SET] button 107 in a desired mode.

FIG. 2B shows a screen while photographing is performed in the 2×2 mode, in which a top-right image is already photographed and bottom-right images are going to be photographed. The already photographed image at the top right 205 is displayed and the images to be photographed are displayed at the bottom right 206 as a view finder. Four images to be photographed can be successively selected by pressing the [+] button 110 and the places are displayed as a view finder.

After four images are photographed, photographing of a group of four images is completed by pressing the [SET] button 107 and the screen returns to the state of FIG. 2A. Before the [SET] button 107 is pressed, it is possible to rephotograph each image. In the case of rephotographing, an image file name uses the file name before rephotographing and video data is replaced with rephotographed video data and stored.

FIG. 3 is an illustration showing file names of the first embodiment.

Each file name is constituted with eight alphanumeric characters and three extensions to be used in DOS. Three characters at the head of a file name are assigned as "IMG" in the case of individual photographing. In the case of panorama photographing, two characters at the head are assigned as "ST" in accordance with the operation for stitching the following image and the subsequent one character is constituted with one of characters "A", "B", "C", ... extracted from the head of the alphabetical character arrangement one by one. Therefore, the maximum number of files in one group is 26 and a structure having more than 26 files is not accepted.

The next five characters of the file name are determined similarly to the case of the file number in Japanese Patent Application No. 8-273494 described in the above conventional example. A file number currFileNo constituted with a five-digit numeral which is increased by one whenever photographing is performed is attached. The file number currfileNo is stored in a camera. When recording media are replaced, the maximum file number FileFound among the file numbers attached to the file names of the files recording in a newly-set recording medium is compared with file numbers stored in a camera. When currFileNo is larger than FileNoFound, the currFileNo is directly used. However, when currFileNo is not larger than FileNoFound, FileNoFound+1 is newly stored in the camera as currFileNo and used. In this case, when the most significant value of a five-digit numeral is "0," "0" is replaced with symbol "_" so that it can be easily seen. Symbol ".JPG" is attached to three extension characters because the characters are a JPEG-compressed image file.

Files are arranged in another directory every 50 file numbers so that they can be easily retrieved. In this case, files with file numbers 3401 to 3450 are arranged in the directory "CTG_0068.CTG" and files with file numbers 3451 to 3500 are arranged in the directory "CTG_0069.CTG".

FIGS. 4A to 4D are illustrations showing structures of panorama images corresponding to FIG. 3.

FIG. 4A illustrates an image structure in the 2×2 panorama mode, corresponding to four image files from "STA_3435.JPG" to "STD_3438.JPG". FIG. 4B illustrates an image structure in the horizontal one-line panorama mode, showing a case in which two images "STA_3441.JPG" AND "STD_3442.JPG" are photographed from the left in order. FIG. 4C illustrates an image structure also in the horizontal one-line panorama mode. When the images are photographed, photographing of the images of FIG. 4B is completed, a set button 206 is pressed to designate the end of photographing of the group, and then the mode dial is kept in the state in the previous panorama mode, the horizontal one-line mode is selected out of the 2×2 mode, horizontal one-line mode, and vertical one-line mode, and moreover a photographing direction is selected and then, the images are photographed.

In this case, three frames from "STA_3443.JPG" to "STD_3445.JPG" show a case in which the images are photographed from the right in order. FIG. 4D illustrates an image structure in the vertical one-line mode, in which two images "STA_3450.JPG" and "STD_3451.JPG" are photographed from the top in order and top and bottom images are arranged in directories different from each other in accordance with the rules that directories are changed every 50 file numbers.

In the above case, the information related to positions is not reflected on file names but it is recorded in files.

Figure 5:
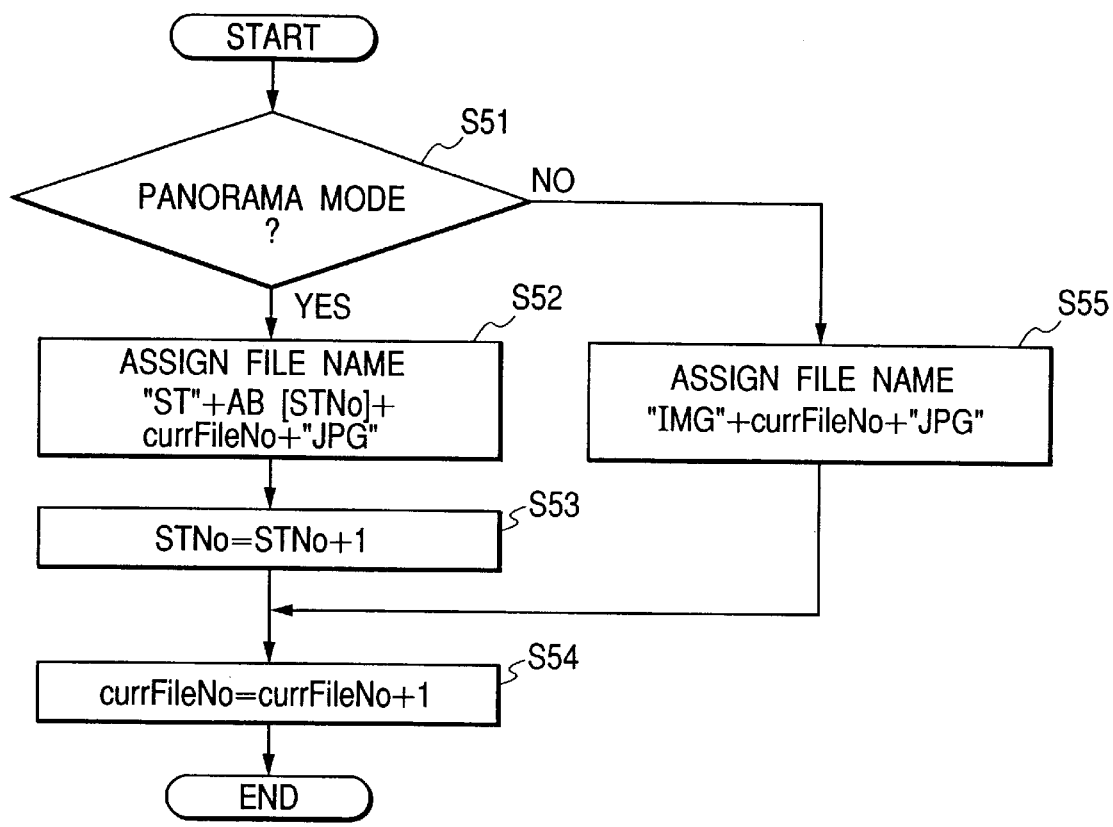
FIG. 5 is a flow chart of file name generation by the first embodiment.

FIG. 5 is a flow chart for assigning file names of the first embodiment. Before photographing, a photographing mode and detailed setting are designated by a mode dial and a detail setting button. Whenever any one of the 2×2 mode, horizontal one-line mode, and vertical one-line mode is selected in the panorama mode, "1" is assigned to number STNo attached in a group of panoramas. Moreover, file number currFileNo is set to "1" when cameras are shipped. After photographing is performed with the release button 102, image processing is performed, the data to be stored is determined, and then a file name is determined in accordance with the flow to store video data in a recording medium.

A series of processings described above is described below in accordance with the flow chart.

In step S51, it is decided whether the present mode is set to the panorama mode. When it is decided in step S51 that the panorama mode is set, a file name for the panorama mode is assigned in step S52. Two characters from the left are set to "ST" and AB[STNo] is extracted from arrangement AB[ ] having each of alphabetical characters "A", "B", "C", . . . in order as a factor and assigned to the third character from the left. The next five characters serve as a five-digit numeral of currFileNo. When the fifth digit is "0," "0" is replaced with "_" so that it can be easily seen. Symbol ".JPG" is attached as an extension.

Then, in step S53, an in-group number STNo is changed to a value added with 1. Then, in step S54, the file number currFileNo is changed to a value added with 1.

Moreover, when it is decided in step S51 that the normal photographing mode is set instead of the panorama mode, a file name for the normal photographing mode is assigned in step S55. Three characters from the left are set to "IMG" and the next five characters serve as a five-digit numeral of currFileNo. When the fifth digit is "0," "0" is replaced with "_" so that it can be easily seen. An extension uses ".JPG". Then, step S54 is started.

In this case, because the processing according to this flow is performed every photographing of one frame, the alphabetical order of file names and the order of file numbers are the same as the photographing order and moreover, the same as the order of storing data.

A file having the head of "STA" represents a file at the head of a group of images. Hereafter, in order of file number, it can be decided from a file name that the head of the next file name up to before "STA" or "IMG" is a group of images.

As described above, according to this embodiment, when a plurality of data values forms a group, it is possible to decide from a file name whether the file is included in the group and decide the order of generation and storage of data by including a character showing a component of the group, a character for separating the group from other group, and a character showing a file number in the file name. Thus, it is possible to quickly correspond to the case in which a user arranges data or arranges and processes the data through a program in a personal computer.

(Second Embodiment)

Figure 8:
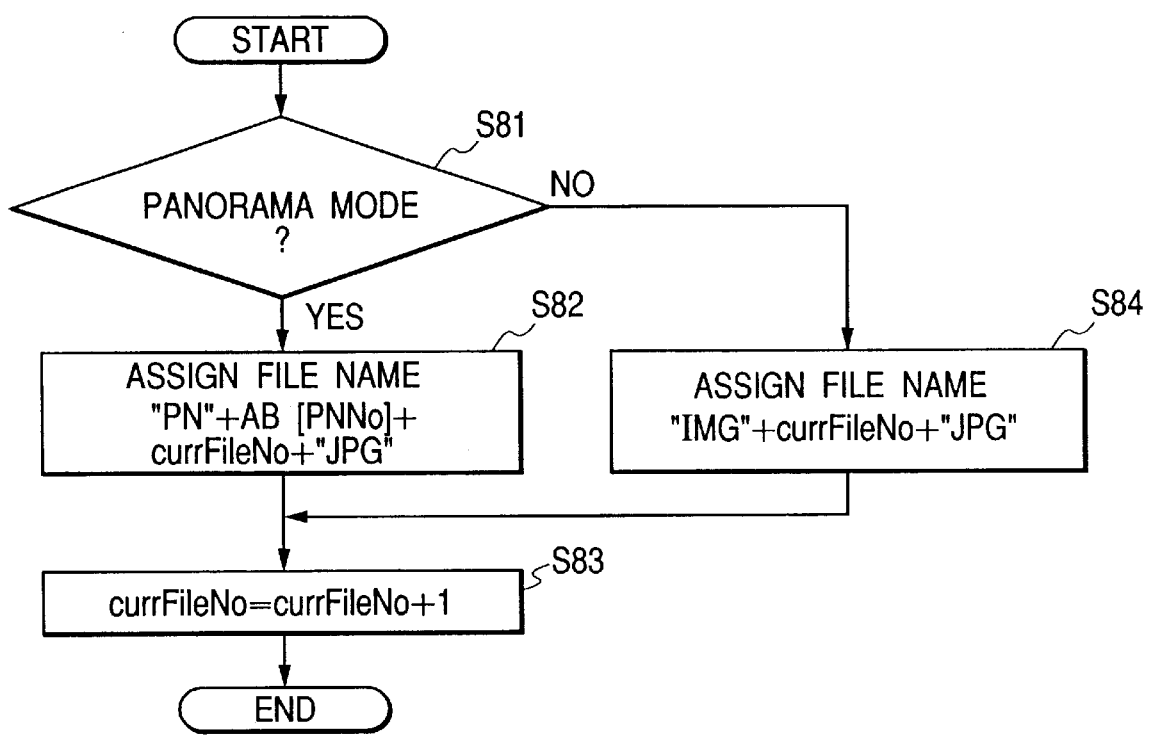
FIG. 8 is a flow chart of file name generation by the second embodiment.

FIGS. 6 to 8 show the second embodiment.

Description of a portion same as that of the first embodiment is omitted.

FIG. 6 is an illustration showing file names. Three characters at the head of a file name are set to "IMG" in the case of individual photographing. In the case of panorama photographing, two characters at the head are set to "PN" and one character following "PN" is set to "A", "B", "C", and "D" in order of photographing whenever a group appears and is constituted with a character to be repeated from "A" when reaching "Z". The next five characters serve as a file number.

FIGS. 7A to 7D show structures of panorama images corresponding to FIG. 6.

FIG. 8 is a flow chart for assigning file names of the second embodiment.

File number currFileNo is set to "1" when cameras are shipped and at the same time, panorama number PNNo is set to "1". Before photographing, a photographing mode and detailed setting are designated by a mode dial and a detail setting button.

Any one of the 2×2 mode, horizontal one-line mode, and vertical one-line mode is selected in the panorama mode. After photographing is performed with a release button 102, image processing is performed to determine the data to be stored. Then, a file name is determined in accordance with the flow to store video data in a recording medium.

Hereafter, description is made in accordance with the flow chart.

In step S81, it is decided whether the present mode is set to the panorama mode. When it is decided in step S81 that the panorama mode is set, a file name for the panorama mode is assigned in step S82. Two characters from the left are set to "PN" and AB[PNNo] is extracted from the arrangement AB[ ] having each of alphabetical characters "A", "B", "C", . . . in order as a factor and assigned to the third character from the left. The next five characters serve as a five-digit numeral of currFileNo.

Then, in step S83, the file number currFileNo is changed to a value added with 1.

Moreover, when it is decided in step S81 that the normal photographing mode is set instead of the panorama mode, a file name for the normal photographing mode is assigned in step S84 similarly to the case of the first embodiment. Then, step S83 is started. When photographing of a group of panorama images is completed, a set button 206 is pressed and end of photographing of the group is designated. In this case, the panorama number PNNo is changed to a value added with 1 (not illustrated).

A file name having the head of "PN" represents a file included in a group of images. Thereafter, in order of file number, it is possible to decide from a file name that a file in which the third character of the file name is the same character is a group of images.

(Third Embodiment)

Figure 11:
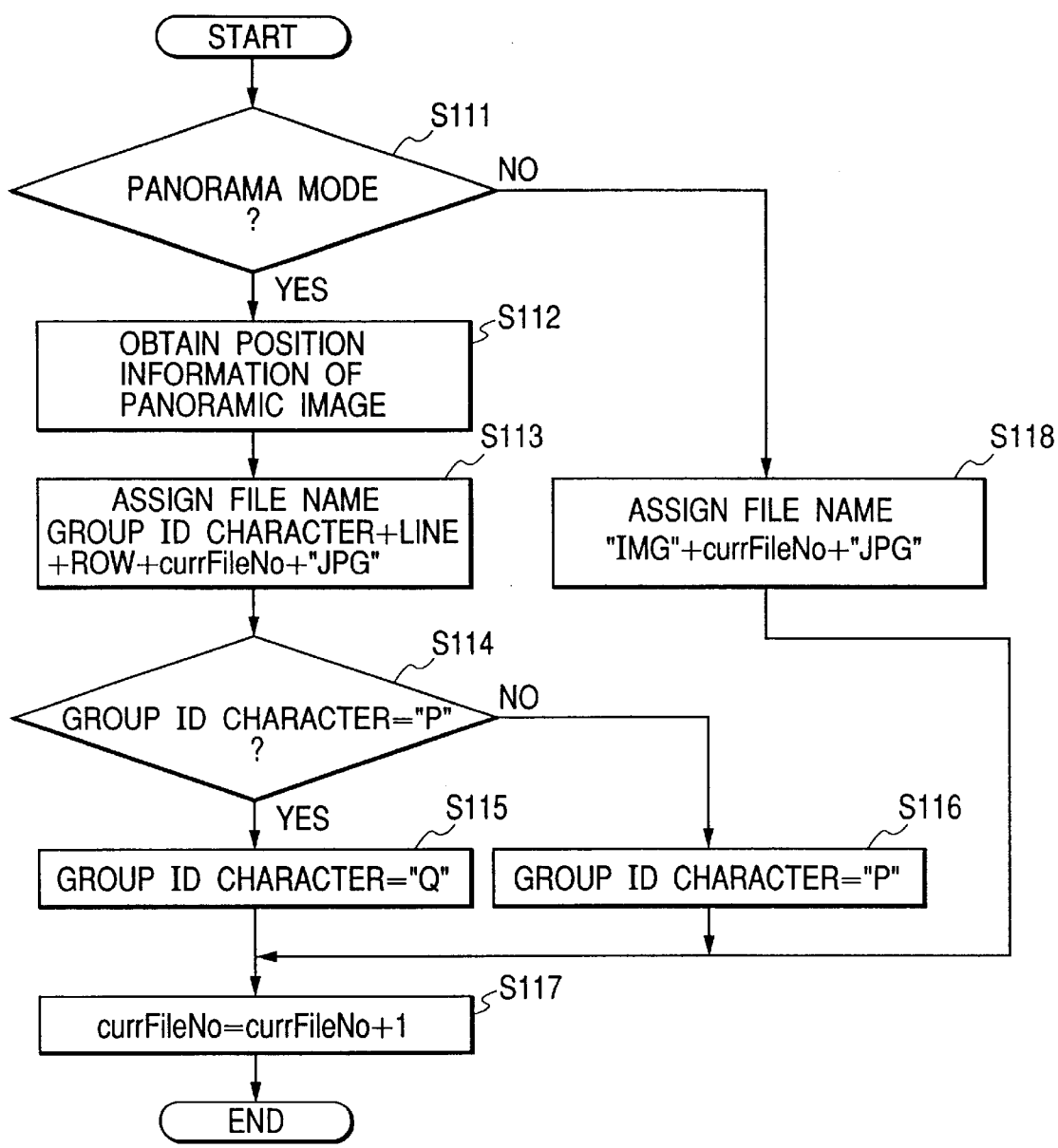
FIG. 11 is a flow chart of file name generation by the third embodiment.

FIGS. 9 to 11 show the third embodiment.

Description of a portion same as that of the first embodiment is omitted.

FIG. 9 is an illustration showing file names. Three characters at the head of a file name are set to "IMG" in the case of individual photographing. In the case of panorama photographing, one character at the head represents a group identification character for repeating "P", "Q", "P", "Q", . . . whenever a group appears in order of photographing and the next two characters show the position for forming a panorama image. They are a numeral showing a column and a row, which the top left is shown as column "0" and row "0." The next five characters represent a file number.

FIGS. 10A to 10D show the structures of a panorama image corresponding to FIG. 9.

FIG. 11 is a flow chart for assigning file names of the third embodiment. File number currFileNo is set to "1" when cameras are shipped and at the same time, a group identification character is set to "P". Before photographing, a photographing mode and detailed setting are designated by a mode dial and a detail setting button. In the panorama mode, any one of the 2×2 mode, horizontal one-line mode, and vertical one-line mode is selected. At the time of photographing, the information showing a position of a panorama formed with an image to be photographed is displayed in a finder 103 or electronic view finder 105 by a processing program in a user's interface. After photographing the image with a release button 102, image processing is performed. After the data to be stored is determined, a file name is determined in accordance with the flow to store video data in a recording medium.

Hereafter, description is made in accordance with the flow chart.

In step S111, it is decided whether the present mode is the panorama mode. When it is decided in step S111 that the panorama mode is set, the information for the panorama-image forming position is obtained from the memory of the user interface in step S112.

Then, in step S113, a file name is assigned. A character at the left end represents a group identification character, the second character from the left end represents a numeral showing what number(th) the column of a panorama image is, the third character from the left represents a numeral showing what number(th) the row of a panorama image is, and the image at the top left end of a panorama is assumed as column 0 and row 0. The next five characters represent a file number. Group identification characters "P" and "Q" are set so as to alternately appear in steps S114, S115, and S116 and the file number currFileNo is changed to a value added with 1 in step S117.

Moreover, when it is decided in step S111 that the present mode is the normal photographing mode, the processing same as the case of the first embodiment is performed in step S118.

It is possible to decide that a file in which the head of the file name is "P" or "Q" is an image file included in a group and files in which "Ps" are arranged in order of file number is a group of panorama images or those in which "Qs" are arranged is a group of panorama images.

Moreover, a position for forming a panorama image from the second and third characters of a file name can be known from a group of images.

(Fourth Embodiment)

Figure 14:
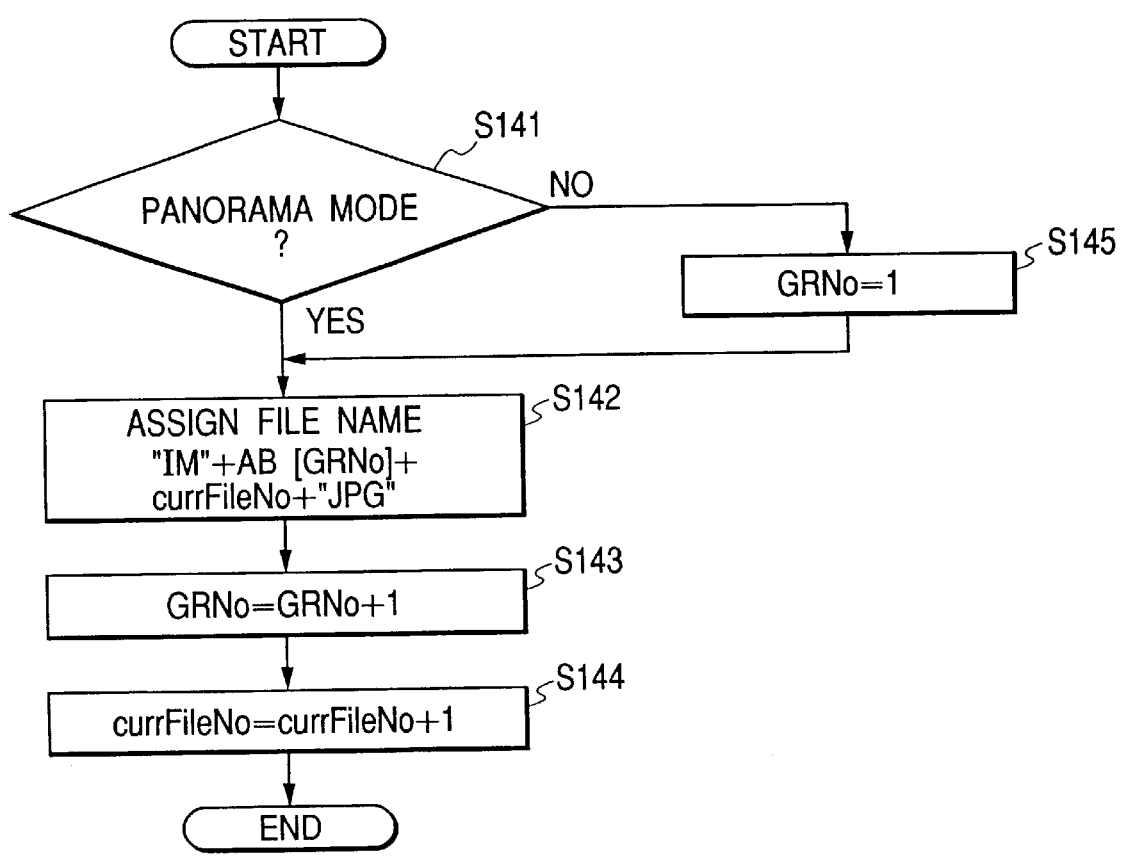
FIG. 14 is a flow chart of fine name generation by the fourth embodiment.

FIGS. 12 to 14 show the fourth embodiment.

Description of a portion same as that of the first embodiment is omitted.

FIG. 12 is an illustration showing file names. Three characters at the head of a file name is set to "IMA" in the case of the individual photographing. Also in the case of panorama photographing, the first image is set to "IMA" and the second and subsequent images are set to "IMB", "IMC", "IMD", . . . in order. Images of more than 26 are not accepted. The next five characters represent a file number.

FIGS. 13A to 13D show structures of panorama images corresponding to FIG. 12.

FIG. 14 is a flow chart for assigning file names of the fourth embodiment. File number currFileNo is set to "1" when cameras are shipped. Before photographing, a photographing mode and detailed setting are designated by a mode dial and a detail setting button. When any one of the 2×2 mode, horizontal one-line mode, and vertical one-line mode is selected in the panorama mode, GRNo is set to "1" (not illustrated). After photographing with a release button 102, image processing is performed to determine the data to be stored. Thereafter, a file name is determined in accordance with the flow to store video data in a recording medium.

Hereafter, description is made in accordance with the flow chart.

In step S141, it is decided whether the present photographing mode is the panorama mode. When it is decided in step S141 that the panorama mode is set, a file name is determined in step S142 in accordance with the then set GRNo. Two characters at the head of the file name are set to "IM" and the next character is provided by extracting AB[GRNo] from arrangement AB[ ] having each of alphabetical characters "A", "B", "C", . . . in order as a factor. The next five characters represent a file number.

Then, GRNo is changed to a value added with 1 in step S143 and file number currFileNo is changed to a value added with 1 in step S144.

Moreover, when it is decided in step S141 that the present mode is the normal photographing mode, a file name is determined in step S145 by setting GRNo to "1".

It cannot be decided from only a file name whose head is set to "IMA" whether the file is included in a group. However, by arranging files in order of file number, it is possible to decide whether to constitute a part of a panorama image in accordance with whether to be followed by "IMB".

For the above embodiments, panorama photographing is described as an example. However, when handing a plurality of images as a group, it is also possible to set a file name in the same manner.

For example, it is possible to assign the same file name in the case of continuous photographing. Moreover, in the case of the above embodiments, the order of file numbers is the same as the order of photographing and also same as the order of storage because a file name is assigned to every photographing of an image and the image is stored in a recording medium. However, it is also possible to temporarily store a plurality of images in a buffer memory and then, obtain a file number and a sequential character in a group in order of recording position when storing the images in a recording medium.

Furthermore, in the case of the above embodiments, sequential characters in a group and sequential characters for every group are shown by alphabetical characters. However, it is also possible to show a file name by increasing the number of digits to form a character string, using a numeral, combining numerals with alphabetical characters, or using two-byte-code characters.

Furthermore, for the above embodiments, a case is described in which a program is stored in a ROM. However, the present invention is not restricted to the above case. It is also possible to realize the function by using any recording medium. Furthermore, it is possible to realize the function with a circuit for performing the same operation.

Furthermore, it is possible to apply the present invention to a system constituted with a plurality of units or an apparatus constituted with a single unit. Furthermore, it is needless to say that the object of the present invention is also achieved by supplying a recording medium recording the program code of the software for realizing functions of the above embodiments to a system or apparatus so that the computer (or CPU or MPU) of the system or apparatus reads the program code from the recording medium to execute it. In this case, the program code read from the recording medium realize the functions of the above embodiments and the recording medium recording the program code constitutes the present invention.

As a recording medium for supplying program code, it is possible to use a floppy disk, hard disk, optical disk, photomagnetic disk, CD-ROM, CD-R, magnetic tape, non-volatile memory card, or ROM.

Moreover, it is needless to say that a case is included in which not only the functions of the above embodiments are realized by executing the program code read by a computer but also the functions of the above embodiments are realized by a part or the whole of actual processing executed by an OS working on the computer in accordance with the designation by the program code.

Furthermore, it is needless to say that a case is included in which the functions of the above embodiments are realized by a part or the whole of actual processing executed by a CPU provided for a function extension board or function extension unit set in a computer in accordance with the designation by the program code read from a recording medium and written in a memory provided for the board or unit.

As described above, according to the present invention, when a plurality of data values becomes a group, it is possible to decide whether the file is included in the group, whether to generate data, and the order of storage in accordance with only the name of a file by including a character showing that the character constitutes the group, a character for distinguishing the group from other group, and a character sowing a file number in the file name. Therefore, it is possible to quickly correspond to the case in which a user arranges data or arranges and processes the data in accordance with a program in a personal computer.

What is claimed is:

1. An image processing apparatus comprising:

first assignment means for assigning identification information to a plurality of images, the identification information including one of a sequential number assigned according to an order of all images without distinguishing between single images and sets of associated images and information indicating whether or not the image is one of a set of associated images; and storage means for recognizably storing single images and sets of associated images in a directory, without using hierarchical directories, with respective file names including the identification information assigned by said first assignment means.

2. The image processing apparatus according to claim 1, further comprising:

input means for inputting an image.

3. An image processing apparatus according to claim 1, further comprising:

second assignment means for assigning further identification information indicating a predetermined set designation for each image constituting one of set of associated images, wherein said storage means for storing the single images and the sets of associated images with the further identification information assigned by said second assignment means.

4. The image processing apparatus according to claim 3, further comprising:

mode setting means for setting an input mode for an image, and control means for controlling said second assignment means in accordance with the input mode set by said mode setting means.

5. The image processing apparatus according to claim 3, wherein said second assignment means assigns the further identification information indicating the predetermined set designation for each image constituting the set of associated images in accordance with the order of input.

6. The image processing apparatus according to claim 3, wherein said second assignment means assigns further identification information designating a position of each image of the set of associated images.

7. The image processing apparatus according to claim 1, wherein the identification information is a sequential file number.

8. An image processing method comprising:

a first assignment step of assigning identification information to a plurality of images, the identification information including one of a sequential number assigned according to an order of all images without distinguishing between single images and sets of associated images and information indicating whether or not the image is one of a set of associated images; and a storage step of recognizably storing single images and sets of associated images in a directory, without using hierarchical directories, with respective file names including the identification information assigned in said first assignment step.

9. The image processing method according to claim 8, further comprising an input step of inputting an image.

10. An image processing method according to claim 8, further comprising:

a second assignment step of assigning further identification information indicating a predetermined set designation for each image constituting one of a set of associated images; and wherein the single images and the sets of associated images is stored with further identification information assigned in said second assignment step.

11. The image processing method according to claim 10, further comprising:

a mode setting step of setting an input mode for an image; and a control step of controlling said second assignment step in accordance with the input mode set in said mode setting step.

12. The image processing method according to claim 10, wherein said second assignment step assigns the further identification information indicating the predetermined set designation for each image constituting the set of associated images in accordance with the order of input.

13. The image processing method according to claim 10, wherein said second assignment step includes assigning further identification information designating a position of each image of the set of associated images.

14. The image processing method according to claim 8, wherein the identification information is a sequential file number.

15. A storage medium having stored therein:

program code for a first assignment step of assigning identification information to a plurality of images, the identification information including one of a sequential number assigned according to an order of all images without distinguishing between single images and sets of associated images and information indicating whether or not the image is one of a set of associated images; and program code for a storage step of recognizably storing single images and sets of associated images in a directory, without using hierarchical directories, with respective file names including the identification information assigned in the first assignment step.

16. The storage medium according to claim 15, further having stored therein:

program code for an input step of inputting an image.

17. A storage medium according to claim 15, further comprising:

program code for a second assignment step of assigning further identification information indicating a predetermined set designation for each image constituting a set of associated images, wherein said program code stores the single images and the sets of associated images with the further identification information assigned in the second assignment step.

18. The storage medium according to claim 17, further having stored therein:

program code for a mode setting step of setting an input mode for an image; and program code for a control step of controlling the program code of the second assignment step in accordance with the input mode set in the mode setting step.

19. The storage medium according to claim 17, wherein the program code of the second assignment step assigns further identification information indicating the predetermined set designation for each image constituting the set of associated images in accordance with the order of input.

20. The storage medium according to claim 17, wherein the program code for the second assignment step assigns further identification information designating a position of each image of the set of associated images.

21. The storage medium according to claim 15, wherein the identification information is a sequential file number.

22. An image file format for recognizably storing single images and sets of associated images in a directory without using hierarchical directories, the format including for each image identification information including one of a sequential number assigned according to an order of all images without distinguishing between single images and sets of associated images and information indicating whether or not the image is one of a set of associated images, and further identification information indicating a predetermined set designation for each image constituting one of a set of associated images.

23. The image file format according to claim 22, wherein the further identification information indicating a predetermined set designation for each image constituting the set of associated images indicates an input order of the images.

24. The image file format according to claim 22, wherein the identification information is a sequential file number.

25. The image file format according to claim 22, wherein the predetermined set designation indicates a position of each image constituting the set of associated images.

26. An image processing apparatus comprising:

determination means for determining whether the image processing apparatus is set in a predetermined photographing mode for grouping a plurality of images into a set of images; and file name generating means for generating a file name for recognizably storing single images and sets of associated images in a directory without using hierarchical directories, said file name generating means generating for each file a file name including one of a sequential number assigned according to an order of all images without distinguishing between single images and sets of associated images and, in the case that said determination means determines that the image processing apparatus is set in the predetermined photographing mode, information indicating the predetermined photographing mode.

27. An image processing apparatus according to claim 26, wherein the predetermined photographing mode is a panorama mode.

28. An image processing apparatus according to claim 27, wherein the file name generating means generates a file name indicating a normal mode when said determination means determines that the apparatus is not set in the predetermined photographing mode.

29. An image processing apparatus according to claim 28, further comprising:

photographing means for photographing an image; and mode selecting means for selecting a photographing mode in the photographing means.

30. An image processing apparatus according to claim 27, wherein, in a panorama photographing mode, the file name generating means generates a file name indicating a photographing order of panorama photographing.

31. An image processing method comprising:

a determining step of determining whether an image processing apparatus is set in a predetermined photographing mode for grouping a plurality of images into a set of images; and a file name generating step of generating a file name for recognizably storing single images and sets of associated images in a directory without using hierarchical directories, said file name generating step generating for each file a file name including one of a sequential number assigned according to an order of all images without distinguishing between single images and sets of associated images and, in the case that it is determined in said determining step that the image processing apparatus is set in the predetermined photographing mode, information indicating the predetermined photographing mode.

32. An image processing method according to claim 31, wherein the predetermined photographing mode is a panorama mode.

33. An image processing method according to claim 32, wherein, when it is determined in the determining step that the image processing apparatus is in the panorama mode, a file name generated in the file name generating step includes a photographing order of panorama photographing.

34. An image processing method according to claim 32, wherein, when it is determined in the determining step that the image processing apparatus is not set in the predetermined photographing mode, a file name indicating a normal mode is generated in the file name generating step.

35. An image processing method according to claim 34, further comprising:

a photographing step of photographing an image; and a mode selecting step of selecting a photographing mode for the photographing step.

36. A computer executable program comprising:

a determining step of determining whether an image processing apparatus is set in a predetermined photographing mode for grouping a plurality of images into a set of images; and a file name generating step of generating a file name for recognizably storing single images and sets of associated images in a directory without using hierarchical directories, said file name generating step generating for each file a file name including one of a sequential number assigned according to an order of all images without distinguishing between single images and sets of associated images and, in the case that it is determined in said determining step that the image processing apparatus is set in the predetermined photographing mode, information indicating the predetermined photographing mode.

37. A computer executable program according to claim 36, wherein the predetermined photographing mode is a panorama mode.

38. A computer executable program according to claim 37, wherein, when it is determined in the determining step that the image processing apparatus is in the panorama mode, a file name generated in the file name generating step includes a photographing order of panorama photographing.

39. A computer executable program according to claim 37, wherein, when it is determined in the determining step that the image processing apparatus is not set in the predetermined photographing mode, a file name indicating a normal mode is generated in the file name generating step.

40. A computer executable program according to claim 39, further comprising:

a photographing step of photographing an image; and a mode selecting step of selecting a photographing mode in the photographing step.

41. An image processing apparatus comprising:

assignment means for assigning information indicating a predetermined set designation for each image of a plurality of images constituting a predetermined set of associated images so as to recognizably store single images and sets of associated images in a directory without using hierarchical directories; and storage means for storing images with respective file names and the information assigned by said assignment means, the file names including one of a sequential number assigned according to an order of all images without distinguishing between single images and sets of associated images.

42. An image processing method comprising:

an assignment step of assigning information indicating a predetermined set designation for each image of a plurality of images constituting a predetermined set of associated images so as to recognizably store single images and sets of associated images in a directory without using hierarchical directories; and a storage step of storing images with respective file names and the information assigned in said assignment step, the file names including one of a sequential number assigned according to an order of all images without distinguishing between single images and sets of associated images.

43. A computer executable program comprising:

an assignment step of assigning information indicating a predetermined set designation for each image of a plurality of images constituting a predetermined set of associated images so as to recognizably store single images and sets of associated images in a directory without using hierarchical directories; and a storage step of storing images in a common directory together with respective file names and the information assigned in said assignment step, the file names including one of a sequential number assigned according to an order of all images without distinguishing between single images and sets of associated images.

* * * * *

UNITED STATES PATENT AND TRADEMARK OFFICE
CERTIFICATE OF CORRECTION

PATENT NO. : 6,704,465 B2
DATED : March 9, 2004
INVENTOR(S) : Shigeru Aoi et al.

It is certified that error appears in the above-identified patent and that said Letters Patent is hereby corrected as shown below:

Title page,
Item [56], References Cited, U.S. PATENT DOCUMENTS,"7/1998 Merrick" should read -- 8/1998 Atkins --.

Sheet No. 6,
Figure 6, "3$^{RD}$ FROM RIGNT" should read -- 3$^{RD}$ FROM RIGHT --.

Sheet No. 9,
Figure 9, "3$^{RD}$ FROM RIGNT" should read -- 3$^{RD}$ FROM RIGHT --.

Sheet No. 12,
Figure 12, "3$^{RD}$ FROM RIGNT" should read -- 3$^{RD}$ FROM RIGHT --.

Sheet No. 15,
Figure 15, "3$^{RD}$ FROM RIGNT" should read -- 3$^{RD}$ FROM RIGHT --.

Column 1,
Line 15, "an" should read -- a --.

Column 2,
Line 18, "CTG-0067.CTG". should read -- CTG_0067.CTG". --.

Column 10,
Line 26, "group," should read -- groups, --.

UNITED STATES PATENT AND TRADEMARK OFFICE
CERTIFICATE OF CORRECTION

PATENT NO.   : 6,704,465 B2
DATED        : March 9, 2004
INVENTOR(S)  : Shigeru Aoi et al.

It is certified that error appears in the above-identified patent and that said Letters Patent is hereby corrected as shown below:

Column 13,
Line 63, "group," should read -- groups, --.
Line 64, "sowing" should read -- showing --.

Signed and Sealed this

Tenth Day of August, 2004

JON W. DUDAS
*Acting Director of the United States Patent and Trademark Office*